May 12, 1925.
W. F. MILLER
1,537,486
TESTING MACHINE FOR SPEEDOMETERS
Filed March 17, 1923   2 Sheets-Sheet 2
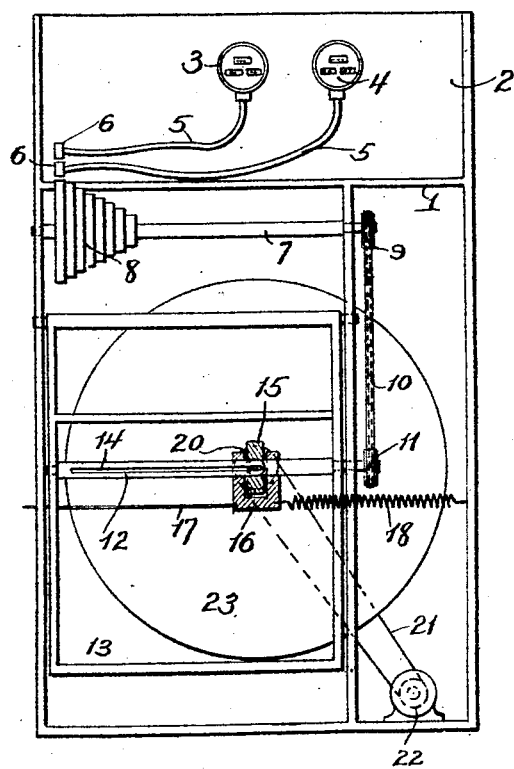
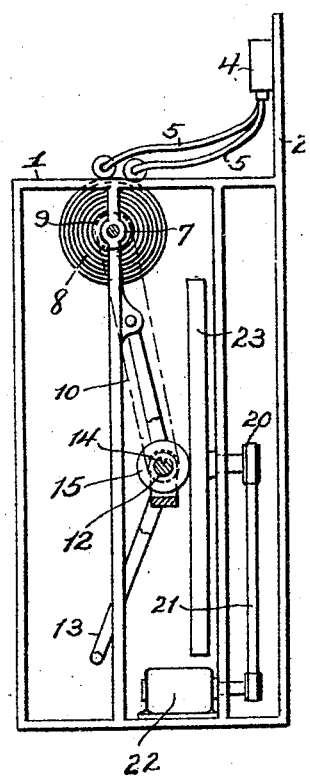
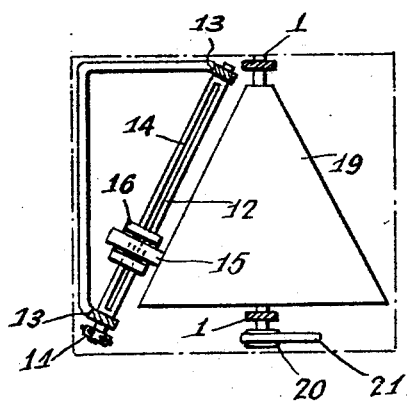

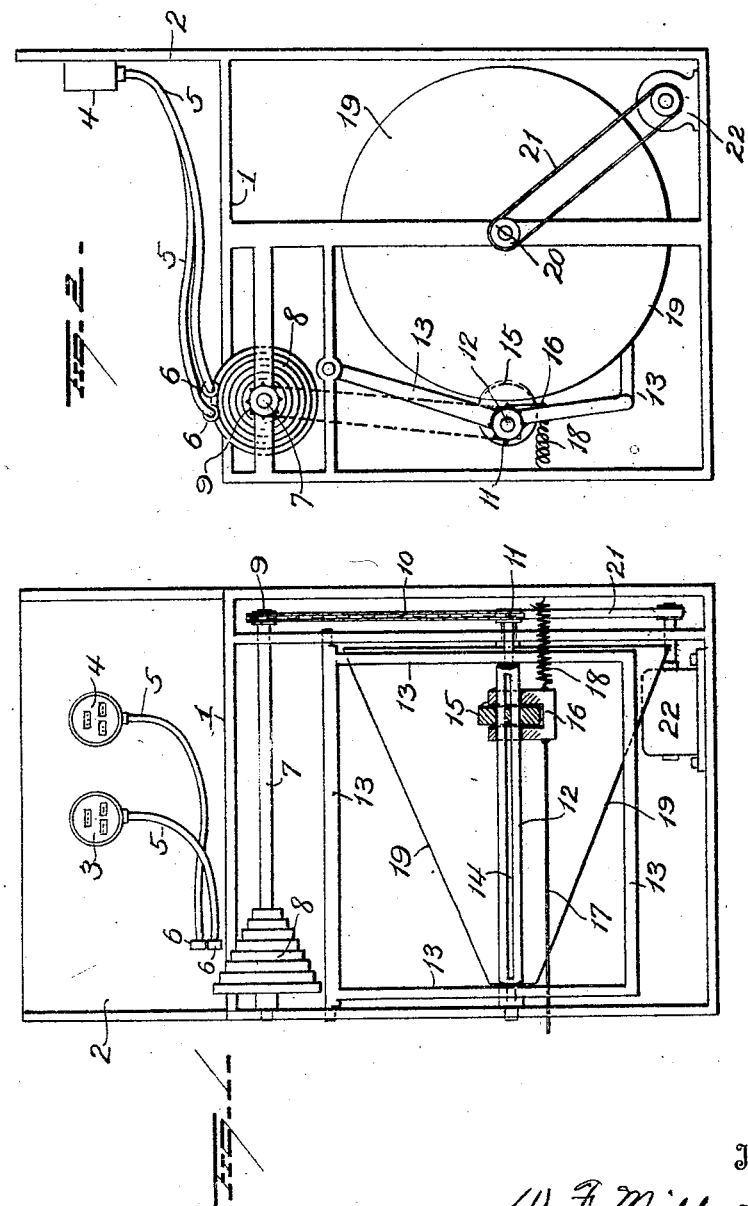

Patented May 12, 1925.

1,537,486

UNITED STATES PATENT OFFICE.

WILLIAM F. MILLER, OF MIAMI, FLORIDA.

TESTING MACHINE FOR SPEEDOMETERS.

Application filed March 17, 1923. Serial No. 625,694.

*To all whom it may concern:*

Be it known that I, WILLIAM F. MILLER, a citizen of the United States, and a resident of Miami, in the county of Dade and State of Florida, have invented certain new and useful Improvements in Testing Machines for Speedometers; and I do hereby declare the following to be a full, clear, and exact description of the invention, such as will enable others skilled in the art to which it appertains to make and use the same.

My invention is a novel mechanism for testing the accuracy of a speedometer to be used upon an automobile, one object of the invention being the production of a simple and inexpensive apparatus whereby the speedometer to be tested may be compared with a master speedometer operating under the same identical conditions. Another object of the invention is the provision of means whereby the speedometer may be tested for various speeds and as applied to a wheel of any standard size. Other objects of the invention will appear in the course of the following description.

In the accompanying drawings, which fully illustrate my invention,

Figure 1 is a front elevation of one embodiment of the invention;

Figure 2 is an end elevation thereof;

Figure 2ª is a plan view;

Figure 3 is a front elevation of another embodiment of the invention, and

Figure 4 is an end elevation of the same.

In the practice of the invention, I employ a table or bench 1 from the back of which a rises a board 2 upon which are supported the master speedometer 3 and the speedometer 4 which is to be tested. From each speedometer a flexible shaft 5 extends and said shaft is equipped with a pinion or pulley 6 at its free end, the two shafts and the two pulleys being of identical construction and size. Below the bench a driven shaft 7 is mounted in the bench-supporting frame and at one end of said shaft gears or pulleys 8 are secured upon the same to rotate therewith, the said gears or pulleys being graduated in the same ratio as the standard makes of automobile wheels. At the opposite end of the shaft 7, a sprocket pinion 9 is secured thereto, a sprocket chain 10 being trained around said pinion and a similar pinion 11 on a countershaft 12 mounted in a swinging frame 13 which is pivotally supported at its upper end in the bench-supporting frame. The shaft 12 is provided with a longitudinal groove or keyway 14 and a friction pulley 15 is fitted loosely on the shaft and provided with a rib or key to engage said keyway whereby the pulley will be constrained to rotate with the shaft but may slide longitudinally thereof. Fitted loosely upon the shaft and spanning the pulley is a yoke 16 which is moved in one direction by a cable or other connection 17 which extends through one end of the frame to any point where it may be conveniently grasped and manipulated by the operator. A spring 18, attached to the yoke and the adjacent end of the frame, acts in opposition to the cable 17 and returns the yoke and the pulley 15 to normal position at once when the cable is released, it being obvious that the pulley follows the movements of the yoke and is thereby shifted along the countershaft. Arranged adjacent the countershaft is a cone pulley 19 having a portion of its surface parallel with the shaft whereby it may engage and impart motion to the pulley 15. The cone pulley is mounted in the bench-supporting frame and has a sprocket pinion 20 connected rigidly and concentrically with its basal end, and a sprocket chain 21 operatively connects said pinion with any convenient or preferred motor, illustrated conventionally as an electric motor 22.

In the form of the invention shown in Figures 3 and 4, a friction disk 23 is substituted for the cone pulley 19 and is arranged at a right angle to the pulley 15, the connections between the shaft of the disk and the motor being correspondingly rearranged, but, otherwise, this embodiment of the invention is identical with that previously described.

In using the machine, the operator by pressure exerted with his foot upon the lower bar of the swinging frame 13 holds the friction pulley or pinion 15 in contact with the cone pulley 19 or the disk 23, as the case may be, and the motor 22 is started thereby setting the several shafts in motion, as will be readily understood. The pinions or pulleys 6 are both held in engagement with that gear or pulley 8 which corresponds to the size of the wheel on the automobile upon which the speedometer under test is to be used. As both speedometers will then be driven by the same element, a comparison of the readings of the speedometer being tested with the readings of the master speedometer will show whether the former is accurate or needs adjustment. The cable or other connection 17 enables the operator to draw the yoke 16 and the pulley 15 along the shaft 12 so that the speed of the driven shaft may be varied and the action of the speedometer under various speeds consequently noted. Upon release of the cable, the spring 18 at once returns the pulley 15 to its initial position.

The machine is simple and compact and may be easily operated to demonstrate the accuracy of the speedometer being tested and to show its responsiveness to variations in speed.

Having fully described my invention what I claim as new and desire to secure by Letters-Patent, is:—

1. In a speedometer-testing machine, a bank of rotatable members of various diameters, means for supporting a master speedometer and a speedometer to be tested adjacent said bank of rotatable members, and means whereby the speedometers may be simultaneously driven from the periphery of the same unit in the bank of rotatable members.

2. In a speedometer-testing machine, a rotatable member, means for suspending a master speedometer and a speedometer to be tested adjacent said rotatable member, flexible shafts extending from the speedometers, and like motion-transmitting elements on the flexible shafts to be engaged with the periphery of the rotatable member.

3. In a speedometer-testing machine, the combination of a rotatable member, means whereby a master speedometer and a speedometer to be tested may be simultaneously actuated from the periphery of the rotatable member, a driving element, and means for operatively connecting the rotatable member and the driving element including a transmitting member to engage the driving element and a swinging frame carrying said transmitting member whereby it may be engaged with or disengaged from the driving element at will.

4. In a speedometer-testing machine, the combination of a driven rotatable member, means whereby the peripheral speed of said member may be noted simultaneously in a master speedometer and a speedometer to be tested, a friction driving element, a friction pulley to be driven by said element, means for shifting said pulley upon the driving element whereby to vary the speed of the pulley, means for swinging the pulley toward and from the driving element, and operative connections between the pulley and the driven member.

5. In a speedometer-testing machine, the combination of a rotatable member, means for simultaneously actuating a master speedometer and a speedometer to be tested from the periphery of said rotatable member, a swinging frame mounted below said rotatable member, a rotating driving member at one side of said frame, a pulley mounted in the swinging frame and held thereby in engagement with the driving member, means for shifting said pulley from end to end of the swinging frame, yieldable means for holding the pulley normally at one end of the frame and operative connection between the pulley and the rotatable member.

In testimony whereof, I have signed this specification in the presence of two subscribing witnesses.

WILLIAM F. MILLER.

Witnesses:
  W. R. SHEARSTON,
  Mrs. M. B. COOPER.